Oct. 25, 1960 F. J. KAMPMEIER 2,957,393
CLAMP FOR ADJUSTABLE ROTARY SPINDLE
Filed Dec. 1, 1958 3 Sheets-Sheet 1
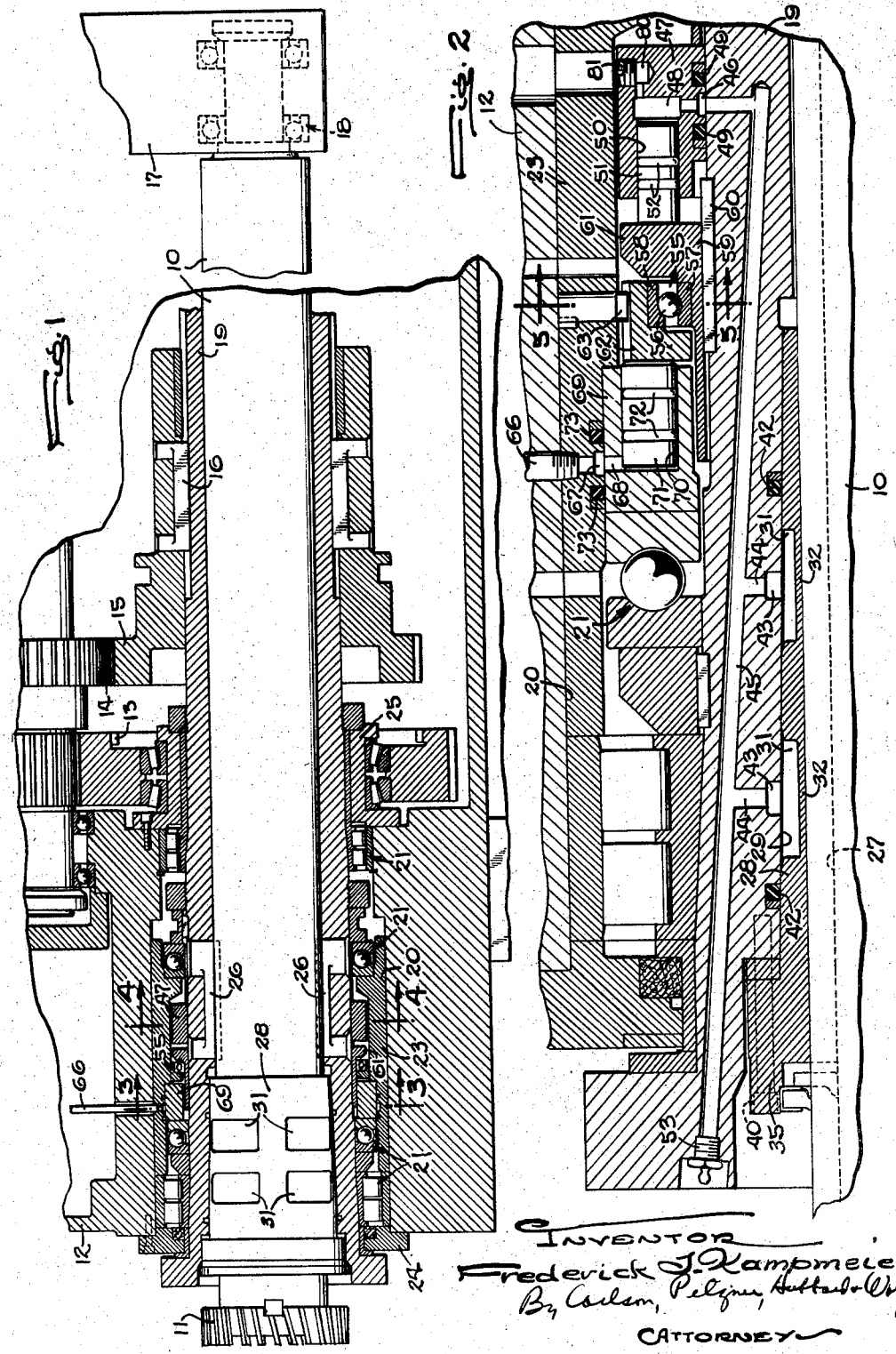
INVENTOR
Frederick J. Kampmeier
By Carlson, Pelzner, Hubbard & Wolfe
ATTORNEY Oct. 25, 1960  F. J. KAMPMEIER  2,957,393
CLAMP FOR ADJUSTABLE ROTARY SPINDLE
Filed Dec. 1, 1958  3 Sheets-Sheet 2
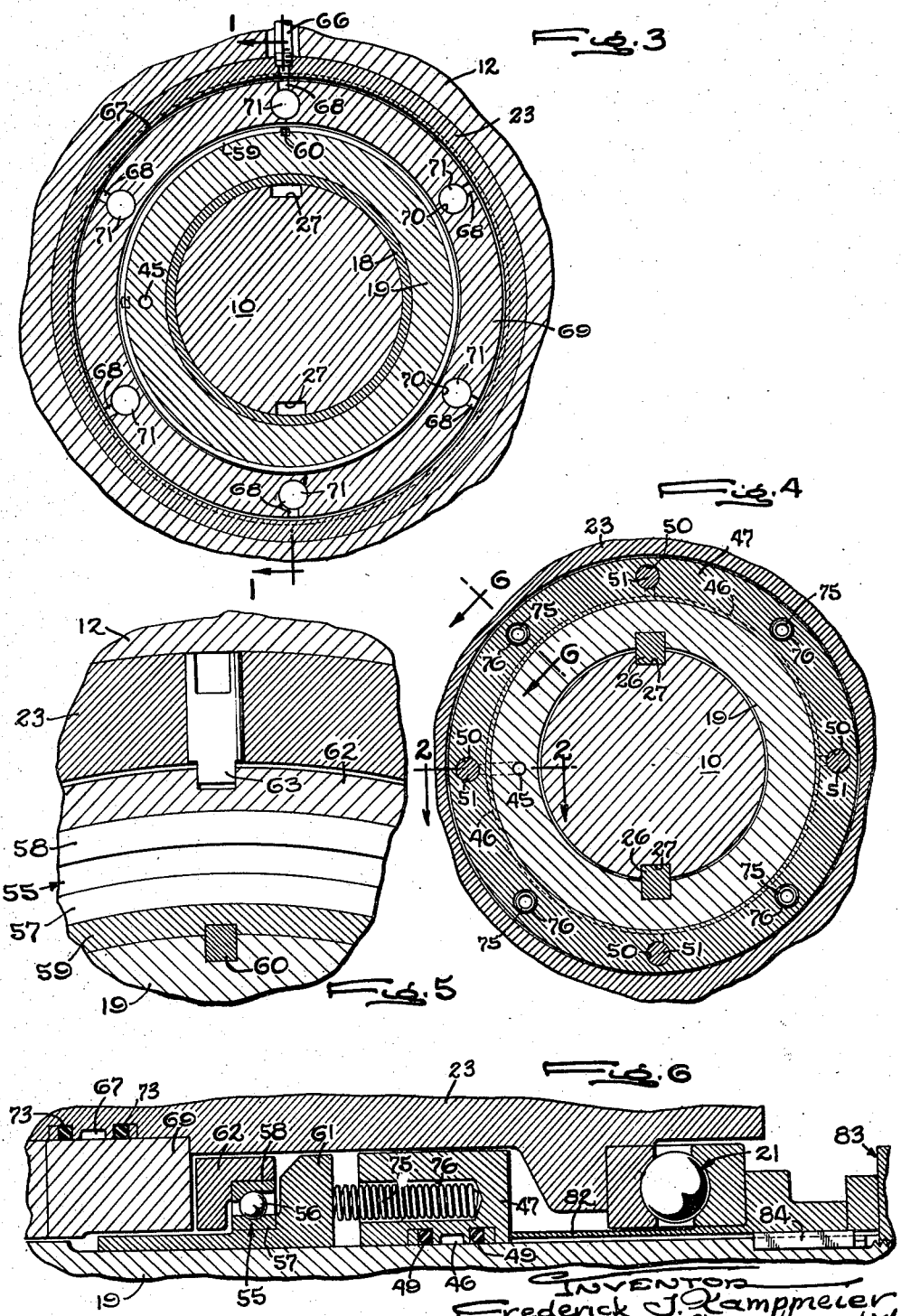

Oct. 25, 1960 F. J. KAMPMEIER 2,957,393
CLAMP FOR ADJUSTABLE ROTARY SPINDLE
Filed Dec. 1, 1958 3 Sheets-Sheet 3
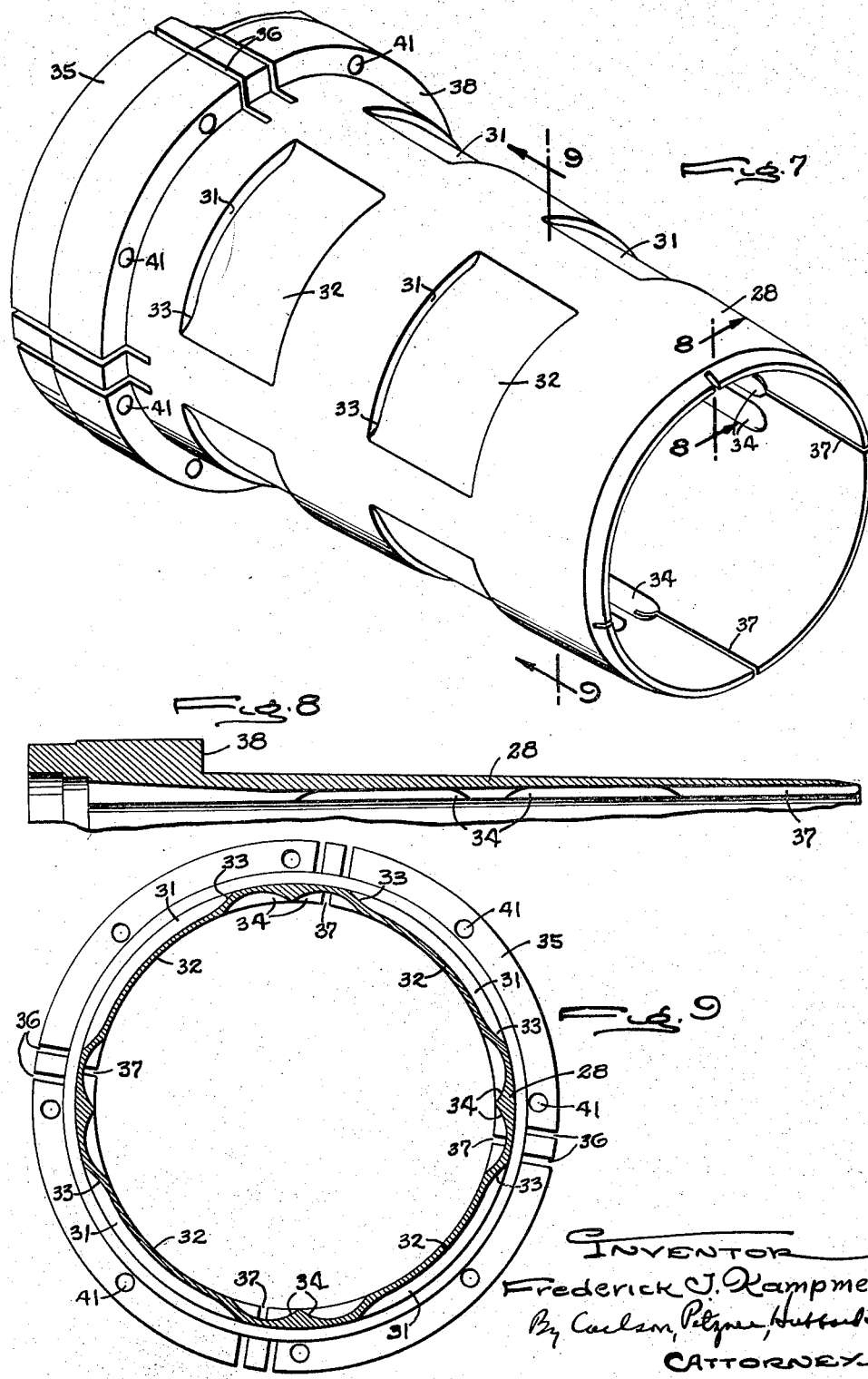
INVENTOR
Frederick J. Kampmeier
By Carlsen, Pitzner, Hubbard & Wolfe
ATTORNEYS

United States Patent Office 2,957,393
Patented Oct. 25, 1960

2,957,393

CLAMP FOR ADJUSTABLE ROTARY SPINDLE

Frederick J. Kampmeier, Rockford, Ill., assignor to The Ingersoll Milling Machine Company, Rockford, Ill., a corporation of Illinois Filed Dec. 1, 1958, Ser. No. 777,314

6 Claims. (Cl. 90—11)

This invention relates to a clamp for frictionally gripping a rotary spindle to hold the position of adjustment of the spindle in a sleeve or quill in which the spindle is mounted for axial adjustment and for rotation in unison with the sleeve. Such a mounting is commonly used for the cutter spindles in machine tools.

The primary object is to actuate a clamp of the above character by hydraulic pressure derived from a separate stationarily mounted or external pressure source, and this with the necessity of using the usual transfer rings.

A more detailed object is to connect the clamp to a closed hydraulic system having parts rotatable with the spindle and filled with liquid placed under pressure relatively movable axially by a force transmitted mechanically from a power actuated servo mounted on a nonrotatable part of the machine.

The invention also resides in the novel arrangement of rotatable and nonrotatable parts for transmitting the force from the nonrotatable servo to the rotating hydraulic system.

Other objects and advantages of the invention will become apparent from the following detailed description taken in connection with the accompanying drawings, in which Figure 1 is a fragmentary longitudinal section of a cutter spindle in its mounting embodying the novel features of the present invention, the section being taken substantially along the line 1—1 of Fig. 3.

Fig. 2 is a fragmentary longitudinal section taken substantially along the line 2—2 of Fig. 4.

Figs. 3 and 4 are fragmentary sections taken respectively along the lines 3—3 and 4—4 of Fig. 1.

Fig. 5 is a fragmentary section taken along the line 5—5 of Fig. 2.

Fig. 6 is a fragmentary section taken along the line 6—6 of Fig. 4.

Fig. 7 is a perspective view of the spindle clamp.

Figs. 8 and 9 are sectional views taken respectively along the lines 8—8 and 9—9 of Fig. 7.

For purposes of illustration, the improved actuator is shown in the drawings incorporated in the mounting of a spindle 10 supporting a cutter 11 for axial adjustment relative to a tool head having a housing 12. The latter carries drive gears 13 and 14 adapted to mesh selectively with a gear 15 keyed at 16 to the spindle. Axial adjustment of the latter is effected through an arm 17 coupled to the spindle by a thrust bearing 18.

As usual the spindle is journaled in an elongated sleeve or quill 19 projecting into a hole 20 in the housing 12 and journaled in accurately alined bearings 21 which in this instance are mounted in a sleeve 23 held in place by rings 24 and 25 clamped against the housing at the outer and inner ends of the hole 20. Keys 26 on the quill project into ways 27 on the spindle to couple the two together while permitting the spindle to be adjusted axially by movement of the arm 17.

The clamp for frictionally coupling the quill to the spindle to hold the latter against axial displacement comprises a bushing 28 telescoped in and secured to the outer end of the quill and contractible around the spindle to grip the latter with the desired clamping force. To this end, the bushing is tapered longitudinally and seated in the outwardly flaring internal wall 29 of the quill and part of the metal over areas thereof spaced both angularly around and longitudinally of the bushing is cut away to provide outwardly opening recesses 31 having relatively thin bottoms 32. In this instance, the bushing has an internal diameter of about eight inches and is a casting composed of bronze.

The recesses 31 are generally rectangular and are about two inches in axial width and each extends over an arc of about seventy degrees. Herein there are two groups of four such areas axially spaced apart and disposed about midway between the ends of the bushing. Thinning of the bushing and weakening thereof at the bottoms of the recesses may be effected by a milling cutter which leaves the ends of each recess curved as indicated at 33, the bushing being about .060 of an inch thick at the bottoms of the recesses 31. The flexibility of the bushing is also increased by milling away the additional metal from the interior of the bushing to form longitudinal grooves 34 between the adjacent recesses 31 of each annular row. For the same purpose, the thickened flange 35 at the outer end of the bushing is slotted longitudinally as indicated at 36 to about the depth of the flange and at points disposed between the longitudinal rows of the recesses 31. The opposite end portion of the bushing is also grooved internally as indicated at 37 beyond the ends of certain of the grooves 34.

The bushing 28 thus constructed is fitted closely into the hole 29 in the quill and has a running fit with the spindle. A shoulder 38 formed by the inner end of the bushing flange 35 abuts against a spacer 39 in the counter-based end of the quill and is clamped to the quill screws 40 extended through holes 41 in the flange. Suitable seals such as O rings 42 are seated in internal peripheral grooves in the quill and are compressed against opposite ends of the bushing periphery beyond the recesses 31.

With the bushing wall thus weakened over various areas distributed over substantially its full length and circumference, the bushing its rendered somewhat flexible and responsive to radial pressure exerted against the bottoms 32 of the recesses 31. That is to say, these areas are pressed inwardly and caused to grip the opposed surface of the spindle thus producing the desired friction clamping action.

In accordance with the present invention, the clamping pressure is derived from a closed hydraulic system having parts which rotate with the quill 19 but which is energized from a pressure source which is not rotatable and is disposed externally of the quill. This hydraulic system includes the recesses 31 which communicate with internal grooves 43 formed in the quill and communicating through ports 44 with passages 45 which extend inwardly along the quill and thence outwardly to an internal groove 46 forming a ring 47 and communicating with annular chambers 48 in the ring. Seals on opposite sides of the groove, such as O rings 49, seal opposite ends of the ring against the quill.

The axial position of the ring is fixed by abutment with a sleeve 82 (Fig. 6) projecting through the inner quill bearing 21 and backed by an adjusting unit 83. The sleeve 82 is keyed at 84 to the quill and turns with the ring 47 which is coupled to the quill by the key 60.

Angularly spaced around the ring 47 are a plurality of cylinders 50 opening axially at the outer end of the ring and into the chambers 48 at their inner ends. A piston 51 slidable in each of the cylinders carries O rings 52 forming a pressure tight seal around the cylinder, The hydraulic system thus carried by the quill and closed by the pistons 51 may be filled with liquid through the passages 45 which extend to the outer end of the quill 19 and are closed by screw caps 53. Air may be forced out of the system through an opening 80 (Fig. 2) communicating with the chamber 48 and normally closed tightly by a screw 81.

With the system thus filled, it will be apparent that the liquid therein may be placed under the desired high pressure by forcing the pistons 51 into their cylinders and toward the chamber 48. This is accomplished mechanically through the medium of a thrust bearing 55 preferably of the anti-friction type having rolling elements such as balls 56 riding one raceway 57 coupled to the quill 19 and an opposed raceway 58 pressed into a non-rotatable part of the tool head housing. Herein, the raceway 57 is seated in a ring 59 surrounding and slidable along the inner end of the quill and internally grooved to receive a key 60 on the quill. A flange 61 on the inner end of the ring abuts against the projecting outer ends of the pistons 51.

In a similar way, the outer raceway 58 of the bearing is seated in a ring 62 externally grooved to receive a key 63 projecting inwardly from the sleeve 23 lining the hole 20 in the housing 12. The ring 62 is thus held against turning but is free to slide axially and inwardly to transmit an axially directed actuating force through the bearing 55 and the ring 59 to the pistons 51 rotating with the spindle.

The force for thus pressing the pistons inwardly and thereby produce the clamping pressure is derived from a suitable power actuator or servo which is preferably an independent source of fluid pressure, for example, a motor driven hydraulic pump (not shown) mounted on the tool head or in the base of the machine. The fluid at the desired pressure is delivered through a suitable conduit having a terminal end 66 extending through the non-rotatable sleeve 23 and communicating with an internal groove 67 therein. This groove registers with holes 68 spaced around a ring 69 and communicating with the closed ends of cylinders 70 having pistons 71 slidable therein and sealed against the cylinder walls by O rings 72. Similar rings 73 provide seals beyond opposite sides of the groove 67 and around the ring 69 which abuts against the inner race ring of the outer one of the ball bearings 21 of the quill.

The pistons 71 project beyond the inner end of the ring 69 and bear against the flanged end of the bearing ring 62. Thus when pressure fluid is admitted through the conduit 66, the pistons 71 are forced outwardly along their cylinders and inwardly along the quill thereby transmitting a powerful actuating force through the thrust bearing 55 to the pistons 51. The latter are thus forced into their cylinders 50 to place the liquid in the rotating hydraulic system under the desired clamping pressure. By employing a number of pistons 51 and 71 spaced around the spindle, the actuating force is distributed uniformly around the bearing 55 while the parts of the latter are turning relative to each other. Under such pressure transmitted to the recesses 31 of the bushing 28, the weakened wall areas of the latter are depressed inwardly and thus caused to grip the spindle thereby clamping the latter firmly in the quill against axial displacement relative thereto.

The clamp remains engaged so long as the pressure is applied to the conduit 66. Upon release of the pressure, compression springs 75 (Fig. 6) operate to retract the rings 61 and 62 and thus return the pistons 71 and the actuating force on the bearing 55. A series of these springs spaced around the ring are seated in recesses 76 in the ring 47 and bear against the bearing flange 61.

The hydraulically actuated squeeze clamp including the sleeve 28, as shown in Figs. 7 through 9, forms the subject matter of my copending continuation-in-part application Serial No. 52,067 filed Aug. 26, 1960.

I claim as my invention:

1. The combination of, a housing, a rotatable tubular quill journaled therein and axially fixed, a spindle splined into said quill and projecting from the outer end thereof, a hydraulically actuated clamp carried by said quill and adapted when energized to grip said spindle, said clamp having a liquid filled pressure chamber, a cylinder on said quill communicating at one end with said chamber and opening outwardly at the other end along said quill, a piston slidable in said cylinder and exposed at the open end thereof, a second cylinder fixed on said housing parallel to said first cylinder and axially spaced from the latter, a piston slidable in said second cylinder and exposed at the open end thereof, a thrust bearing surrounding said quill between said pistons and having race rings respectively abutting against the adjacent exposed ends of said first and second pistons, said race rings being respectively splined into said housing and onto said quill to permit axial sliding of said bearing along the quill, and means on said housing for delivering fluid under pressure to the closed end of said second cylinder.

2. The combination of, a housing, a rotatable tubular quill journaled therein and axially fixed, a spindle splined into said quill and projecting from the outer end thereof, a hydraulically actuated clamp carried by said quill and adapted when energized to grip said spindle, said clamp having a liquid filled pressure chamber and comprising a bushing telescoped in and secured to said quill, and recesses opening outward radially and formed in the bushing in communication with said chamber to weaken the bushing at the bottoms of the recesses and permit contraction of the bushing around the spindle when said chamber is placed under high pressure, a cylinder on said quill communicating at one end with said chamber and opening outwardly at the other end along said quill, a piston slidable in said cylinder and exposed at the open end thereof, a second cylinder fixed on said housing parallel to said first cylinder and axially spaced from the latter, a piston slidable in said second cylinder and exposed at the open end thereof, a thrust bearing surrounding said quill between said pistons and having race rings respectively abutting against the adjacent exposed ends of said first and second pistons, said race rings being respectively splined into said housing and onto said quill to permit axial sliding of said bearing along the quill, and means on said housing for delivering fluid under pressure to the closed end of said second cylinder.

3. The combination of, a housing, a tubular quill journaled therein and axially fixed, a spindle splined into said quill for axial adjustment and projecting from the outer end thereof, a hydraulically actuated clamp carried by said quill and adapted when energized to grip said spindle and hold the same against turning relative to the quill, said clamp having a liquid filled pressure chamber, a plurality of parallel cylinders mounted on and spaced angularly around said quill and each communicating at one end with said chamber, said cylinders opening at the other ends along said quill, pistons slidable in said cylinders and exposed at the open ends thereof, a second series of parallel cylinders fixed on said housing paralleling said first cylinders and spaced axially from the latter, pistons slidable in said second cylinders and exposed at the open ends thereof, a thrust bearing surrounding said quill between said first and second pistons and having race rings respectively abutting against the adjacent exposed ends thereof, said race rings being respectively splined into said housing and onto said quill to permit axial sliding of said bearing along the quill, and means on said housing for delivering fluid under pressure to the closed ends of said second cylinders.

4. The combination of, a housing, a tubular quill journaled therein and axially fixed, a spindle splined into said quill for axial adjustment and projecting from the outer end thereof, a hydraulically actuated clamp carried by said quill and adapted when energized to grip said spindle, said clamp having a liquid filled pressure chamber, a plurality of parallel cylinders on said quill communicating at one end with said chamber, said cylinders opening at the other ends along said quill, pistons slidable in said cylinders and exposed at the open ends thereof, a thrust bearing surrounding said quill and having a ring abutting against the exposed ends of said pistons and spline coupled to said quill, the other ring of said bearing being splined into said housing to permit axial sliding of said bearing along the quill, and means on said housing for exerting axial pressure on said second ring whereby to place the fluid in said cylinders under pressure.

5. The combination defined by claim 4 in which said clamp comprising a bushing telescoped in and secured to said spindle and having outwardly opening recesses communicating with said chamber to weaken the bushing at the bottoms of the recesses whereby to permit contraction of the bushing around the spindle when said chamber is placed under high pressure.

6. The combination defined by claim 5 in which said recesses are arranged in groups spaced around and also axially along said bushing.

References Cited in the file of this patent

UNITED STATES PATENTS 2,792,764     Carlsen et al. _____ May 21, 1957

FOREIGN PATENTS 929,762     Germany _____ July 4, 1955